(No Model.)
M. M. HOOTON.
WIRE TWISTER FOR GRAIN BINDERS.
No. 266,153. Patented Oct. 17, 1882.
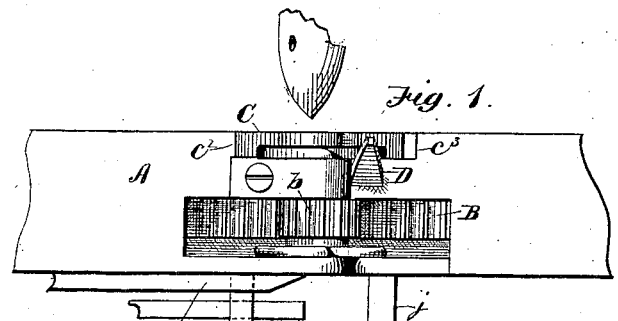
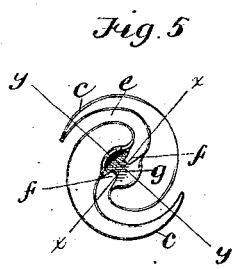
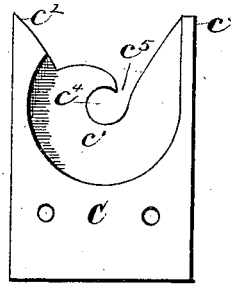
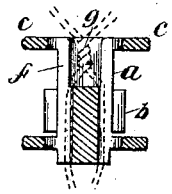
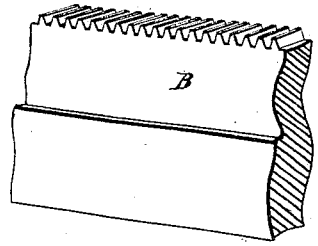
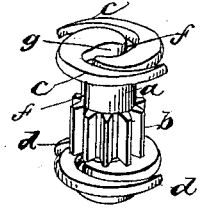
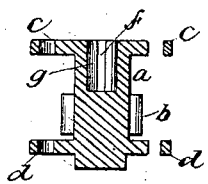
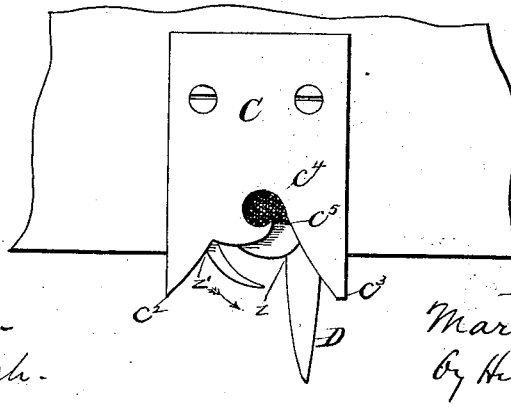
Attest,
W. H. Knight
Fred F. Church
Inventor.
Marsena M. Hooton
by Hill & Church
His Atty's
N. PETERS, Photo-Lithographer, Washington, D. C.

UNITED STATES PATENT OFFICE.

MARSENA M. HOOTON, OF CENTRALIA, ILLINOIS.

WIRE-TWISTER FOR GRAIN-BINDERS.

SPECIFICATION forming part of Letters Patent No. 266,153, dated October 17, 1882.

Application filed March 14, 1881. (No model.)

*To all whom it may concern:*

Be it known that I, MARSENA M. HOOTON, of Centralia, in the county of Marion and State of Illinois, have invented certain new and useful Improvements in Wire-Twisters for Grain-Binders; and I do hereby declare the following to be a full, clear, and exact description of the same, reference being had to the accompanying drawings, forming part of this specification, in which—

Figure 1 is a front view of the twisting mechanism; Fig. 2, a top view of the same; Fig. 3, a bottom plan view of the plate which guides the wire into the twisting-head; Fig. 4, a perspective view of the twisting-head; Fig. 5, a top view of the same; Fig. 6, a sectional view taken on the line $x\,x$, Fig. 5; Fig. 7, another sectional view taken on the line $y\,y$, same figure; and Fig. 8 a view showing a portion of the rack which rotates the twisting-head.

Similar letters of reference in the several figures denote the same parts.

My invention relates to that class of automatic grain-binders in which the binding is effected by passing a band of wire around the bundle or gavel and uniting the ends of the wire by twisting; and the particular improvement consists in a novel form of twisting-head constructed as hereinafter described, and pointed out in the claim.

The special construction of the twisting-head is best shown in Figs. 4, 5, 6, and 7. Its body or shank is made cylindrical externally at $a$ to form a suitable bearing upon which it may rotate, while at $b$ it is preferably provided with cog-teeth for engagement with a suitable operating rack-bar or pinion. At the upper end of the shank a pair of horizontal curved and tapering hooks, $c\,c$, are arranged, and at the lower end of the shank are arranged a corresponding pair of hooks, $d\,d$. Each of the hooks in each pair curves outward and around the base of its fellow hook, so as to leave a curved slot or space, $e$, between the two, which curved slot terminates at or leads into a slot or groove, $f$, formed radially in the shank and extending longitudinally from end to end thereof, as shown in Figs. 5 and 6, there being one such longitudinal slot or groove on each side of the head. At its upper end the shank is further made hollow or chambered out, so as to form a substantially circular recess or chamber, $g$, into which the longitudinal grooves $f$ lead, as shown.

When arranged for operation the twisting-head is located in bearings in a frame or table, A, with its cogged portion $b$ preferably in engagement with a suitable operating-rack, B, and the recessed end of its shank uppermost, as shown. Over the head is preferably placed a plate, C, having a recessed portion, $c'$, for the accommodation of the upper hooks of the head, and having also arms or projections $c^2$ $c^3$, with inclined faces for assisting in guiding the wire into the head, and an opening, $c^4$, of circular form immediately over the recess in the shank of the head, into which the wire is guided through a passage, $c^5$. A projecting guiding-spur, D, is also preferably employed for directing the wire into the head.

It is necessary for the effective operation of the twisting-head that some form of clamping mechanism be employed below said head for holding the wire while the twisting is being done, and one form of such mechanism is shown in the drawings, consisting of a movable clamping-jaw, $j$, operated intermittingly from the rack-bar, and a fixed clamping-jaw, $j'$, co-operating with said movable jaw.

The operation of this twisting mechanism is as follows: One end of the binding-wire being held fast between the clamping jaws $j\,j'$, and the twisting-head being in the position shown in Fig. 2, the binding-arm carrying the other end of the wire rises, the strand of wire being brought against the bases of the hooks $c\,d$ on one side of the head, as shown at $z$ in Fig. 2. It should here be remarked that the eye in the end of the binding-arm through which the wire passes is at one side of the binding-arm, as shown in Fig. 1, so that said eye operates in a plane parallel to though not coincident with a vertical plane passing through the closed lower clamping-jaws and the point $z$. Such being the relation of the parts, when the binding-arm, after passing around the bundle, comes down again it brings the second strand of wire not alongside of the first strand, but between the backs of the other hooks and the side of the inclined projection $c^2$, as shown at 100

$z'$ in said figure. The twisting-head, which up to this time has been stationary, is now rotated in the direction indicated by the arrow, Fig. 2, by the operation of the rack-bar, both strands being grasped by opposite hooks and carried in through the slots $e\ e$ into the longitudinal radial grooves $f\ f$, and within the circular opening $c^4$ in the cap-plate C. As the twisting-head continues to rotate the two strands of wire are twisted together within the recess or chamber $g$ of the head, as shown in dotted lines, Fig. 6, after which a suitable cutter, F, automatically operates to cut off both strands below the head, thus enabling the bound bundle of grain to be removed. Soon after the twisting begins the movable clamping-jaw opens, and grasping the last strand carried into the head below the cutter clamps it to a fixed jaw, and there holds it in position for the next binding operation.

The radial grooves $g$, made longitudinally in the head, I regard as of great importance in holding more securely the wires while being twisted and in bringing the two strands more closely together and preventing their cutting or breakage.

It is evident that my improved twisting-head is adapted to operate as well in that class of machines in which one strand is delivered behind the hooks on one side of the head, the head then rotated half-round, and the other strand then delivered by the descending binding-arm behind the hooks at the opposite side of the head, and the head finally rotated several times to form the twist, as it is to operate in connection with the mechanism and in the manner herein shown and described.

I claim as my invention—

A twisting-pinion having curved projecting hooks on opposite sides and radial slots or grooves at the bases of the hooks for receiving and holding the wire while the twist is being made, substantially as described.

MARSENA M. HOOTON.

Witnesses:
WM. A. BLACKSTOCK,
FRED F. CHURCH.